United States Patent [19]

Strojny et al.

[11] 4,159,470

[45] Jun. 26, 1979

[54] DATA COMMUNICATIONS SYSTEMS EMPLOYING REDUNDANT SERIES TRANSMISSION LOOPS

[75] Inventors: Lawrence J. Strojny, Muskego; Paul Froehling, Franklin; Robert D. Galaszewski, Milwaukee, all of Wis.

[73] Assignee: Johnson Controls, Inc., Milwaukee, Wis.

[21] Appl. No.: 797,368

[22] Filed: May 16, 1977

Related U.S. Application Data

[63] Continuation-in-part of Ser. No. 598,376, Jul. 23, 1975, abandoned.

[51] Int. Cl.² .................. H04Q 9/00; G08C 25/00
[52] U.S. Cl. .................. 340/147 SC; 179/175.2 C; 340/146.1 BE
[58] Field of Search ....... 340/147 SC, 163, 146.1 BE; 325/2, 304; 343/176, 177; 179/175.2 C, 175.3; 178/69

[56] References Cited

U.S. PATENT DOCUMENTS

| | | | |
|---|---|---|---|
| 3,048,840 | 8/1962 | Ferrar et al. | 343/176 |
| 3,213,370 | 10/1965 | Featherston | 325/304 |
| 3,451,042 | 6/1969 | Jensen et al. | 178/69 R |
| 3,518,549 | 6/1970 | Sarati | 340/147 SC |
| 3,603,736 | 9/1971 | Morroll | 179/175.3 S |
| 3,681,694 | 8/1972 | Sarati | 340/147 SC |
| 3,742,154 | 6/1973 | Bidlack et al. | 179/175.3 |
| 3,812,299 | 5/1974 | Fleischfresser et al. | 179/175.2 C |
| 3,845,472 | 10/1974 | Buchanan et al. | 340/147 R |
| 3,851,311 | 11/1974 | Mila | 340/147 R |
| 3,863,220 | 1/1975 | Osawa et al. | 340/147 LP |
| 3,876,983 | 4/1975 | Zafiropulo et al. | 340/147 SC |
| 3,878,463 | 4/1975 | Lanigan | 340/147 SC |
| 3,920,975 | 11/1975 | Bass | 340/146.1 BE |
| 3,940,566 | 2/1976 | Jeppsson | 340/146.1 BE |
| 4,011,542 | 3/1977 | Baichtal et al. | 340/147 SC |
| 4,017,828 | 4/1977 | Watanabe et al. | 340/146.1 BE |

*Primary Examiner*—Donald J. Yusko
*Attorney, Agent, or Firm*—Andrus, Sceales, Starke & Sawall

[57] ABSTRACT

A loop communication system includes a loop controller originating and terminating parallel output multiple bit message frames over a pair of trunks to remote stations, each of which includes a multiplexing connection means to the incoming trunk segments, with means to selectively and operably connect one of the incoming trunk segments to a frame processor. A pair of transmitters are also provided at the interface means and actuated to synchronously and correspondingly retransmit the process signal over the two outgoing trunk lines or segments. A logic circuit directly transmits the signal from one receiver and blocks the other until the first fails. The message is processed and retransmitted by a pair of transmitters over the two outgoing trunk segments. Suitable indicators coupled into the logic circuit signal the failure. A contact status circuit initiates transmission of the failure location via message frames to the controller. A control switch by-passes the station and is operable manually or in response to a power failure.

16 Claims, 4 Drawing Figures

DATA COMMUNICATIONS SYSTEMS EMPLOYING REDUNDANT SERIES TRANSMISSION LOOPS

BACKGROUND OF THE INVENTION

This is a continuation-in-part of application Ser. No. 598,376, filed on July 23, 1975, abandoned.

This invention relates to a data communication system employing redundant series transmission loops.

Data communication systems employing a plurality of redundant series loops which interconnect a plurality of communication stations to a monitoring and controlling station. Various communication systems have been developed to handle or process relatively large amounts of data. Multiplex communication systems are widely employed. In such systems which require a high degree of continuity, redundant wiring and electronics may be provided to ensure continuity of data transfer in the presence of circuit failures such as broken wires, short circuit conditions, ground faults within the communication system and the like. For example, multiplexing systems have been constructed with a primary cable and a secondary cable defining two separate transmission paths. The primary cable is normally operative and, in the presence of a fault condition, the secondary cable is made operative. It may be particularly difficult to identify or impossible to identify a particular fault location, particularly where both the primary and the secondary trunks of the system are inoperative. Additionally, a single fault in any one cable or trunk such as a break may completely disable that particular portion of the trunk system after which the total system's reliability is dependent upon the auxiliary or secondary trunk system.

A particularly satisfactory data communication system employed the more recent series loop development as shown in U.S. Pat. No. 3,845,472, which issued to Stuart R. Buchanan, et al, on Oct. 29, 1974. As disclosed therein, a loop controller, which includes a suitable programmed computer, generates information message frames in time spaced relation, with each of the frames including a multiple bit plurality of information bits. The frames are circulated in a loop through a series coaxial cable to a plurality of remote stations. At each of the remote stations, the frames are processed bit by bit and then retransmitted to the following station either modified or unmodified in accordance with system response. Each frame may provide communication with a remote station or may be transmitted unmodified for communication with a subsequent station in accordance with a predetermined programming and instructions. If there is a failure within the circulating loop system, a break in the coaxial cable connecting the several stations in series and to the central controller communication will, of course, terminate. If the fault occurs within a particular loop remote station, an automatic by-pass switch is activated to maintain the loop transmission of the message frames by by-passing of that particular station. If there is an opening in the coaxial cable between the stations, communication will terminate. U.S. Pat. No. 3,845,472, previously noted, discloses a method of detecting the open circuit and generating message frames which are transmitted to the central controller if an incoming message frame is not received within a preset time. Such special frames may contain the particular station address and thereby indicate and identify the location of the fault as the immediately upstream station.

Although this fault locating system is highly desirable as permitting direct identification of the location of a break in the system, there is no provision for maintaining the desired communication and, thus, in high security systems or applications additional communication means should be provided. For example, the usual complete redundant coaxial cable might be provided with fault responsive means to automatically activate such cable. This requires a reasonably complex and expensive construction and further provides a single additional level of security which will, of course, demand prompt attention to the first detected fault.

SUMMARY OF THE PRESENT INVENTION

The present invention is particularly directed to digital communication systems employing a transmission loop and particularly provides a plurality of transmission trunks constructed to significantly increase the level of transmission reliability in a simple and inexpensive construction. Generally, in the present invention, the several trunk segments of the plurality of trunks are separately connected as continuously active paths to maintain and provide transmission in the loop through the same or different segments of both trunks. In another unique aspect and feature of the present system, a monitoring means continuously monitors the receiving of message frames over the plurality of trunk means and identifies the occurrence of a fault and further the location of the fault or faults within the plurality of loop segments by transmission of an appropriate message frame.

More particularly, in accordance with a practical embodiment of the present invention, a data communication loop system includes at least two transmission trunk coaxial lines or cables interconnected between the controller and the several remote stations. The trunks are coupled at each receiving station or the message frames or coded information is transmitted over both trunks to the remote station. An interface at each remote station couples the trunks to the message processing means through a special loop selection means which normally selects transmission from the primary trunk line and transmits it to the processing circuitry. After appropriate processing, the message frame is retransmitted onto the following remote station over both of the outgoing trunk segments.

The interfacing at a remote station includes trunk fault detection means. If the incoming primary trunk segment fails, the selection means automatically detects that failure and connects the secondary trunk segment to supply the message frame to the remote station processing circuit, which again processes the message frame in the normal manner and retransmits it over both of the outgoing trunk segments. Each of the remote stations further includes a suitable status sensing and transmitting circuit means within the processing circuitry to monitor the incoming loop trunk connections. If the selection circuit detects a failure in either trunk, the corresponding circuit is actuated to generate a message frame indicating the location of the fault and the particular trunk which has failed. Thus, the dual transmitted messages are retransmitted over the dual trunk segments. Even though there is a fault in the primary loop between two stations, the primary trunk segments between the other remote stations continue to operate to transmit the message signals. Thus a fault in any given trunk loop does not disable that complete trunk system but only that portion between two stations. In the event that both loop segments or trunk segments between the same remote stations should fail and generate a complete open system, the failure can, of course, be identified and reported in the same manner as for a single loop system in accordance with the illustration and teaching of U.S. Pat. No. 3,845,472.

More particularly, in the preferred practical construction, each remote station includes a multiplexing connection means to the incoming trunk segments, with means to selectively and operably connect one of the incoming trunk segments to the frame processing means. The multiplexing connection means includes individual receivers for each trunk segment. A pair of transmitters are also provided at the interface means and actuated to synchronously and correspondingly retransmit the process signal over the two outgoing trunk lines or segments. A logic circuit means connects the two receiver means to the input of the frame processing means. Logic circuit means is generally established to directly transmit the signal from the primary trunk receiver and blocks the further transmission from the second receiver. In the event there is a failure in the primary trunk line associated with the first receiver, the logic circuit means automatically detects the failure to receive the message frame via the primary trunk line and operably disconnects the first receiver and operable connects the second receiver to the message frame processing means. The signal will, of course, be similarly processed in the same manner as if received over the first trunk line and, once again, retransmitted by the two transmitters over the two outgoing trunk segments. Suitable indicators are preferably coupled into the several segments to indicate at the remote station the failure of the particular incoming trunk to provide a visual indication at the station. In addition, loop failure detection means are connected into a contact status monitoring circuit or module operable to transmit the location via a message frame through the loop. The status monitoring module provides information in message frames which identify the location and loop segment identification (primary and secondary) that has failed to accurately place the fault location.

A by-pass control switch is also preferably provided to directly by-pass the loop remote station in the event a failure within the particular remote station is of a type interfering with continued communication over both trunks to subsequent stations.

In a particular application of the present invention, the trunk segments are connected to individual receivers, the outputs of which are selectively connected by the loop selection means to the frame processing means. In addition, each of the receivers may be connected to actuate a loop failure detection circuit in the form of a timing means such as a retriggerable monostable circuit. The outputs of the timing circuits, in essence, generate a two-bit address which is employed to automatically select a proper receiver output and to transmit it via the loop selection circuit to the frame processing means. The monostable circuits may directly drive suitable visual indicators as well as status sensing relays or similar circuits to provide an on-off logic to a status sensing and transmitting module.

The use of the individual trunk segments between the several stations independently of any other portion of the corresponding trunk lines increases the redundancy in the system. Thus a fault in one trunk segment between two remote stations and a fault in a different trunk segment between different stations will not affect the continued reliable communication through the total loop path. This, in combination with the identification and the location of fault or faults within the system as well as those which prevent normal communication, provides a high degree of security and particularly adapts the system to heating, ventilating and air conditioning systems and even more particularly to life safety systems such as fire, burglar, and intrusion alarm systems.

The present invention thus provides a redundant trunk loop communication system with increased reliability of the data transmission and with provision for precise indication of the location of a fault or faults within the several trunk systems.

BRIEF DESCRIPTION OF THE DRAWING

The drawing furnished herewith illustrates a preferred construction of the present invention in which the above advantages and features are clearly disclosed as well as others which will be readily understood from the following description of such illustrated embodiment.

In the drawing.

DESCRIPTION OF THE ILLUSTRATED EMBODIMENT

Figure 1:
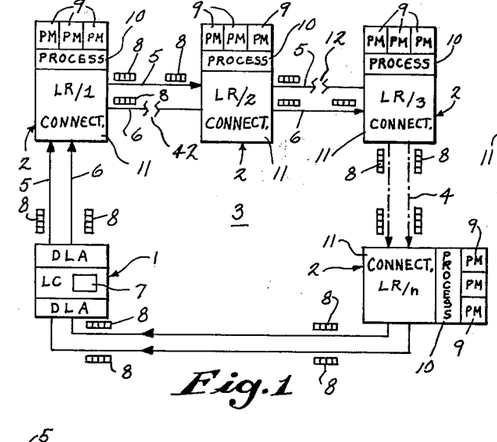
FIG. 1 is a diagrammatic illustration of a loop communication constructed in accordance with the present invention.

Referring to the drawing and particularly to FIG. 1, the present invention is shown applied to a serial communication loop system generally similar as that disclosed in U.S. Pat. No. 3,845,472 and which generally includes a loop controller 1 which is operable to establish a programmed monitoring and operation of a plurality of generally similar remotely located stations 2, only four of which are shown, to complete a data system 3. A broken line illustration 4 adjacent the final loop station 2 indicates that a very significant greater number of loop remote stations will normally be employed in the loop system 3. In accordance with the present invention, the loop controller 1 and the several remote stations 2 are connected in series through a pair of transmission paths or trunks which are formed by individual trunk segments 5 and 6 between the several stations 1 and 2. Each of the trunk segments 5 and 6 may be a suitable coaxial cable with the individual segments connected between the several stations including the connection to the upstream and downstream side of the loop controller 1, as illustrated in FIG. 1. As more fully developed hereinafter, transmission is simultaneously effected over both trunks 5 and 6.

The loop controller 1 generally includes a stored program computer 7 which is capable of performing sequences of internal stored instructions and furthermore is capable of modifying such instructions as directed by the instructions in the circuit programming. The loop controller 1 includes a suitable means for generating and serially transmitting time spaced information or message frames 8 simultaneously over the connected trunk segments 5 and 6 to the first station 2. The controller 1 may be a conventional, single loop unit with a suitable input and output adapter, such as disclosed in the copending application of F. J. Wolters, entitled "MULTIPLE MESSAGE FRAME ADAPTOR APPARATUS FOR LOOP COMMUNICATION SYSTEM" which was filed on the same day as this application and is assigned to the same assignee, to receive transmitted dual message frames in the single frame controller.

Each of the message frames 8 is a series of binary signal bits as diagrammatically illustrated and which may be identified by the conventional symbols as at a logic "0" or "1" for serial transmission with quiet periods between message frames 8 identifying such. As more fully developed in the Buchanan, et al Pat. 3,845,472, each message frame 8, which is shown substantially abbreviated for simplicity of illustration, provides for selective coupling to any one of the remote stations 2–4, inclusive, for transmission of information or data to, or the receiving thereof from, one or more modules at such remote stations. The controller 1 constitutes the originator of each frame 8 and also the final destination of each frame, and further automatically interprets any information or data received from a remote station. The loop controller 1 will also verify the receipt of each message frame and transmit appropriate acknowledgement and clear message signals or frames to the respective stations. Each of the remote stations 2, as also more fully developed in the Buchanan, et al patent, would generally include multiple functions and include a plurality of different functional point units or modules 9 which are encoded and selectively interconnected to the message frames by a signal processing unit 10 for communicating with the loop controller 1.

Thus, the loop controller 1 would generally generate "dedicated" frames which are transmitted to particular stations with a specific address and "available" frames which are circulated through the loop and available to any remote station which desires to transmit information to the central station or loop controller or any other communication device in the system; for example, a portable operational console unit, not shown.

The present invention is particularly directed to the adaptation of the station-to-station segments of trunks 5 and 6 and their unique interconnection at each loop remote station to create a high degree of transmission reliability by providing maximum redundancy for any given plurality of loops. Each remote station 2 includes a trunk termination and connection circuit 11 which is uniquely constructed to continuously monitor the condition of the incoming trunk segments 5 and 6 and selectively connects only one trunk to the message processing unit 10 where the frame bits are sequentially processed in the same manner as in a single loop system. If the message is assigned to the remote station, it will further be processed through a particular point module 9, transmitting or receiving information. In accordance with the present invention, the termination and connection means 11 receives the processed message, modified or unmodified, and retransmits each bit of the message frame over both of the outgoing trunk segments 5 and 6 to the downstream remote stations, as shown in FIG. 1. If a fault exists in any given segment of trunks 5 or 6, circuit 11 automatically selects the opposite trunk segment. For example, assume the trunk 5 is normally selected via circuit 11 to transmit the message frames 8 to unit 10. Further, assume a fault 12 exists in the trunk segment 5 between the second and third stations, as diagrammatically illustrated in FIG. 1. The connection circuit 11 at the downstream remote station 3 will automatically sense the failure of receipt of such message frame 8 over trunk segment 5 and immediately switch over to process the message frame 8 which appears on trunk segment 6. The existence of the illustrated fault in the trunk segment 5 between such stations does not remove the complete trunk system associated with trunk 5 but merely that segment. The other segments of trunk 5 continue to function and maintain redundant transmission systems in all of the other sections of the loop as a result of the selective trunk connection circuit 11.

Figure 2:
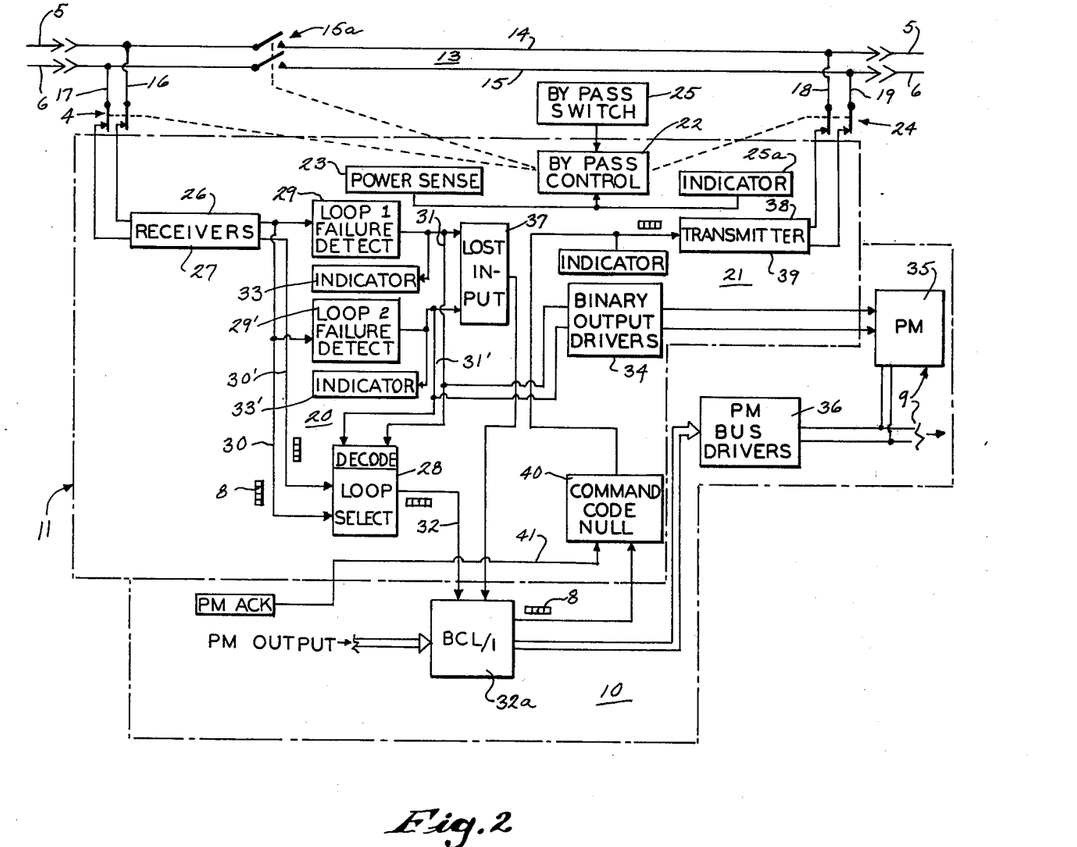
FIG. 2 is a block diagram illustrating a preferred construction of the interfacing at a remote station in accordance with the teaching of the present invention.

A preferred construction of the present invention is shown in block diagram in FIG. 2, wherein a single loop remote station 2 is shown and in particular the construction of the two trunk connection circuit 11 is shown in greater detail to more clearly set forth a preferred embodiment.

Referring particularly to FIG. 2, the connection circuit 11 generally includes a termination board 13 having a pair of by-pass circuit paths such as conductive foils 14 and 15, with opposite end terminals for direct connection to the incoming trunk segments 5 and 6 and to the outgoing trunk segments 5 and 6. A normlly open by-pass control switch 15a opens each of the coaxial cables 14 and 15 for trunks 5 and 6. The normally open switch unit 15a thus, in effect, provides a pair of incoming trunk termination means and a pair of outgoing trunk origination means to the opposite sides of unit 15a. The board 13 further includes a pair of miniature input coaxial cables 16 and 17 connected respectively to the incoming side of switch unit 15a for transmitting of the message bits on trunk lines 5 and 6 to the connection circuit 11, and a pair of miniature output coaxial cables 18 and 19 connected to the output side of switch unit 15a for connection of trunks 5 and 6 into the connection circuit 11.

The connection circuit 11 in particular includes an incoming signal section 20 which, simultaneously, receives the message frames via the connecting cables 16 and 17, detects the presence of the message frame, selects and connects one of the receiver outputs to the remote processing unit 10. Circuit 11 further includes a transmitting section 21 receiving the processed message frame from unit 10 and retransmits such message frame over both of the coax connecting lines 18 and 19 of the outgoing trunk segments 5 and 6.

A by-pass control unit 22 continuously monitors the operating condition of the remote station, in particular, the power status as shown by block unit 23, and is operable to automatically actuate the normally open switch unit 15a in the trunk connection cables 14 and 15. The by-pass control unit 22 also includes normally closed switches 24 in the connecting coax cables 16–19. The control unit 22 provides for direct disconnection and by-pass of remote stations in the presence of a remote station fault which would interrupt the continued operation of the loop system and thereby maintain continuity of communication. The by-pass control unit 22 may also include a suitable manually controlled switch 25 to manually actuate and/or reset the by-pass control switch system as well as visual indicators that indicate which input segments are active and output transmission is occurring.

More particularly, in the illustrated embodiment of the invention, the input section 20 of circuit 11 includes a pair of receivers 26 and 27 which may be suitable amplifiers having their inputs similarly connected to the miniature coax connecting cables 16 and 17 for respectively receiving the message frames from trunks 5 and 6. The outputs of the receivers 26 and 27 provide appropriately scaled signals for connection and processing by the frame handling logic circuitry of unit 10. The output of each receiver 26 and 27 is similarly connected to a logic selection unit 28. The connection of receiver 26 is described with the corresponding elements for receiver 27 identified by corresponding primed numbers. The output of receiver 26 is connected to a loop trunk failure detection unit 29 and directly to one input line 30 of loop selection unit 28 to transmit the message frame 8. The failure detection unit 29 is connected via an interlock line 31 to a control or logic input of the input loop selection unit 28.

The second receiver 27 which receives the message frame 8 transmitted via trunk 6 is similarly connected via failure detection unit 29' to a second logic input 31' of the input loop selection unit 28. The second receiver 27 is also connected directly via line 30' to transmit the message frame to the second input of the loop selection unit 28.

The loop selection unit 28 has a single output line 32 to processing unit 10 to selectively transmit the message frame to a frame logic handling unit 32a of unit 10.

Under normal operating conditions, the message frame 8 is transmitted directly from the first receiver 26 through the loop selection unit 28 to the message processing unit 10 and particularly logic handling unit 32a.

If the trunk segment 5 opens, short circuits or the like, the message frame 8 would not be received at the receiver 26. The loop failure detection unit would immediately detect such failure and the loop selection unit 28 be signaled to switch over and transmit the message frame established in receiver 27 with the continued proper transmission and processing of the message frame 8 with retransmission of the message frame via the output of transmitter section 21.

The output of the failure detection units 29 and 29' are also similarly connected in the fault identifying system. The failure detection units 29 and 29' are connected to actuate related visual indicators 33 and 33' at the remote station 2 to provide a visual indication of a fault in the trunk 5 upstream of the remote station. The units 29 and 29' are also connected to binary output drivers 34 of circuit 11 to establish a corresponding logic signal to a status sensing module 35 of the message processing unit 10. Module 35 is coupled to the frame logic handling unit 32a, with other modules through a bus driver unit 36.

The binary output drivers 34 connected to the output of failure detection units may be of any suitable construction and preferably form A type relays or solid state circuits with similar outputs. These binary output drivers are connected to the input of a status contact, status sensing and fault transmitting system, such as disclosed in the issued U.S. Pat. No. 3,832,688. As noted therein a contact status sensing module normally provides for monitoring of a plurality of different contacts and thus the individual loops may be continuously and separately monitored with the failure of a particular loop specifically identified for the loop controller. As more fully disclosed in the Buchanan et al patent, such a module 35 is operable to select an "available" message frame 8 received over the incoming operable trunk 5 or 6, fill the frame with the address of the remote station and then retransmit such filled message frame to the loop controller 1. The loop controller will respond by transmitting a "dedicated" message frame to this particular contact sensing point module to obtain an indication of which segment failed. The central processing of the filled available frame will, of course, provide the necessary information for attending to the correction of the fault if necessary.

A lost input monitoring unit 37 includes a pair of inputs connected respectively to the failure detection units 29 and 29' for trunks 5 and 6. The unit 37 is an "And" logic function and is connected via a line 37a to the frame logic handling unit 32a for actuating a message frame generator, not shown, with transmission of generated message frames via transmitting section 21 to indicate and locate the fault in same trunk segments 5 and 6 upstream of a remote station.

In accordance with the embodiment of FIG. 2, the transmitting section 21 includes a pair of similar, digital message bit transmitters 38 and 39, having paralleled inputs connected to the output of the message frame logic handling unit 32a of unit 10 for retransmitting of the message frame, modified or unmodified, in accordance with the frame processing. An interlocking command code null unit 40, which may be a simple logic unit, has one input connected to the logic handling unit 32a to receive the processed message frame 8 and a second input connected to a point module acknowledge line 41 to permit transmission of the command portion of the message only if the message frame 8 has been properly received and acknowledged by the addressed point module.

The transmitters 38 and 39 may be of any suitable construction adapted to receive a common input signal and transmit the corresponding message signals over the coupling coax cable 18 and 19 to the outgoing trunk lines 14 and 15 for transmission of the message frames to the downstream remote station via trunk segments 5 and 6.

The several elements shown in FIG. 2 may of course be of any suitable construction. For example, the loop failure detection units 29 and 29' may be conventional retrigerable, monostable, multivibrating circuits, which, in combination, generate a two bit digital address which is employed by a logic gating within the loop selection unit 28 to select the signal from the appropriate receiver 26 or 27 for frame processing. The output of the retrigerable monostable circuits therefor are at either one of the two logic levels which may be conveniently identified as a logic "0" or a logic "1" in accordance with conventional practice. The first message bit retriggers the monostable circuit and generates the desired logic "1". If, for example, the trunk 5 includes a fault and the message frame 8 is not received, the failure detection unit 29 will reset and, consequently, a logic "0" address is impressed on the logic input of loop selection unit 28. For example, the input loop selection unit 28 may be a multiplexing device which is adapted to selectively transmit a signal from either one of the input receiver lines 30 or 30' to the single output line 32, such as the IC chip manufactured and sold by Texas Instruments, Inc. of Dallas, Tex., under their type Serial No. SN 74153. A specification sheet for such a structure, as shown in the *TTL Data Book For Design Engineers*, published by Texas Instruments in 1973, particularly provides for the binary coded data selection of input transfer gating.

The dual loop detection units 29 and 29' are provided to maintain a positive control of the system and permit direct addressing to the loop controller 1 even though the non-operative loop segment is not being employed. For example, assuming the trunk 5 loop segment is operating properly, a failure may occur in the second loop trunk segment 6 as shown at 42 in FIG. 1. In the absence of the dual loop failure detection unit for such segment, there would be no way to transmit such failure to the loop controller 1 even though the system would be operating without the complete redundancy desired and considered to exist.

In summary, the system operates with the remote stations 2 functioning essentially in the same manner as previously described in U.S. Pat. No. 3,845,372, to receive the successive message frames 8 and to logically process each bit and retransmit said bit to a succeeding station 2. The routing of data and information to the frame handling logic unit 32a of the processing unit 10 is selectively controlled to maintain transmission in the event there is a failure in the loop upstream of the station 2 and further to announce and identify the occurrence of such fault along with the addressing of the fault location. The individual processing at each remote station 2 maintains each of the trunk segments 5 and 6 operative independently of the operability of any other associated trunk segments and thus maintains maximum redundancy in the transmission system in combination with continuous monitoring of the possible fault conditions in any portion of the trunks including the redundant or standby transmitting trunk segments.

Figure 3:
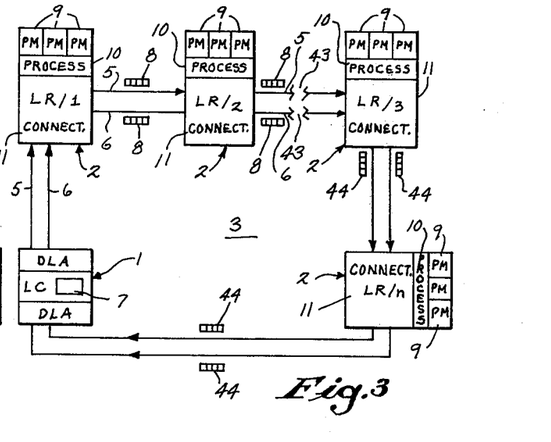
FIG. 3 is a view similar to FIG. 1 illustrating an alternate failure condition.

In FIG. 3, the system of FIG. 1 is shown with a double fault 43 occurring in both trunk segments 5 and 6 between the second and third remote stations 2. In this instance, the connection unit 11 at the third remote station 2 will fail to receive either of the message frames 8 generated upstream following the creation of the dual faults. As a result, both of the loop detection units 29 and 29' at the station 2 will be activated to generate corresponding loop failure signals. The signals applied to the NAND gate forming the lost input unit 37 will then generate a logic signal to the message processing unit and actuate the message generator, generally in accordance with the teaching of the Buchanan et al patent. The output will be a series of unique message frames 44 transmitted from the third remote station 2 and retransmitted, unmodified by all subsequent stations 2 to the loop controller 1 which will, of course, interpret the messages to identify the location of the faults for the necessary processing.

The system will thus reliably detect single breaks, grounds, wire-to-wire shorts as well as any combination thereof. The circuit components particularly when mass produced are relatively inexpensive components and thus can be conveniently applied to any serial loop communication system and are particularly desirable in high security systems where other systems of redundancy will not provide the same degree of reliability and are reasonably more complex and expensive.

As noted above, the present invention desirably provides complete redundancy monitoring but may, obviously, be otherwise modified from the specific illustrated embodiment within the broad aspects of the present invention.

Although shown in a dual loop system, the redundancy system may be expanded if even higher degrees of security are required. Further, as each of the interconnecting segments or trunk elements are, in essence, individually monitored segments, the system could even be developed with a single trunk provided between selected stations where there is essentially no danger of any fault condition ever arising.

The illustrated components for interconnecting and processing the message frames can, as previously noted, be of any suitable construction.

Figure 4:
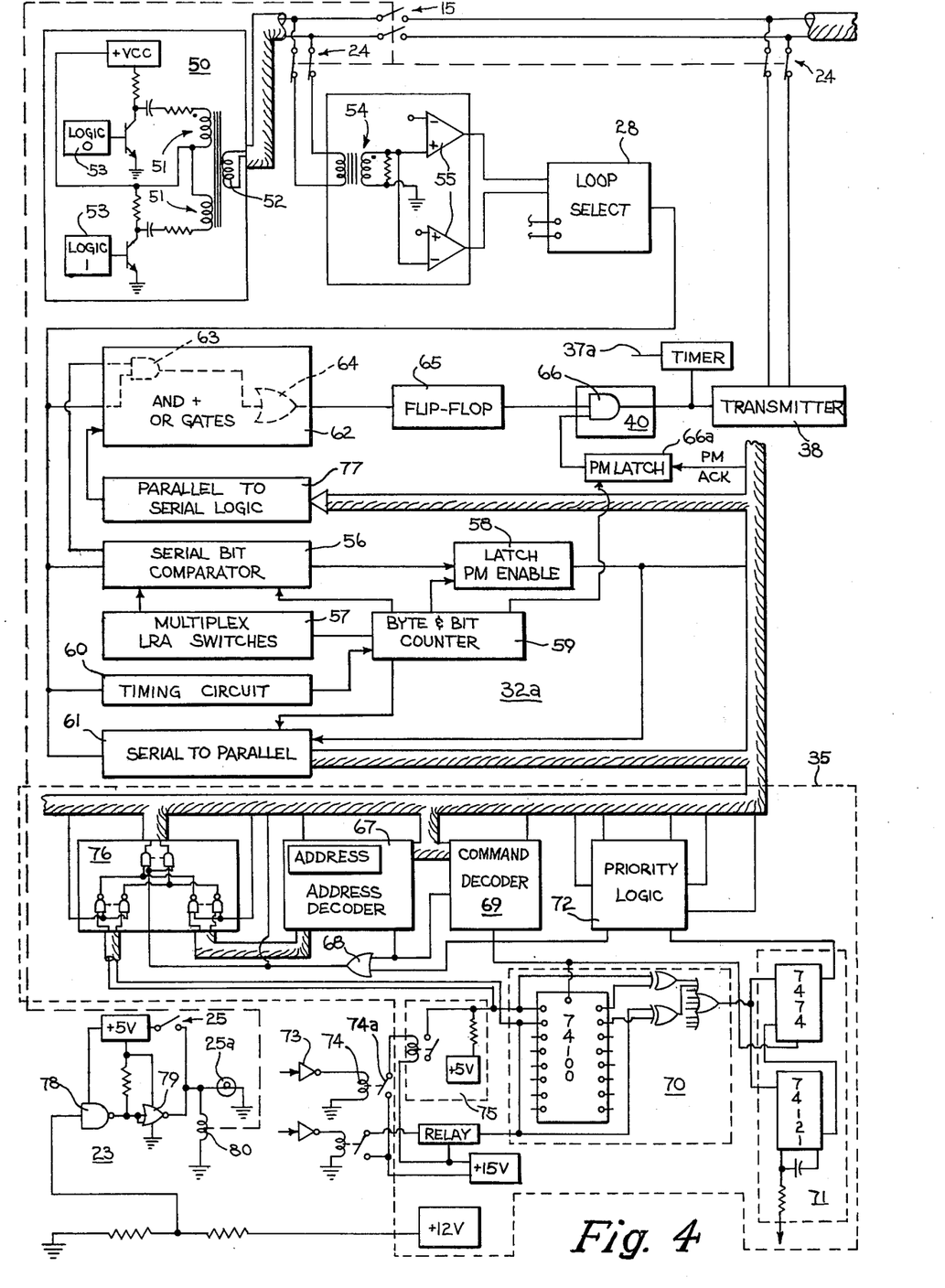
FIG. 4 is a schematic detailed illustration of certain standard components providing functions set forth for the block diagram illustrations of FIGS. 1-3.

A simplified circuit using known logic circuits and systems such as disclosed in the various cross-referenced applications, now patents, and other conventional logic circuitry and components for providing of the various functions is illustrated in FIG. 4.

In FIG. 4, a signal generator or transmitter 50 is illustrated, which may form a transmitter at the main loop controller or a transmitter at any previous loop remote station. The illustrated transmitter is similar to that disclosed in U.S. Pat. No. 3,798,609 issued on Mar. 19, 1974 and generally includes a coupling transformer having a pair of input windings 51 and an output winding 52 connected to the transmission lines 5. A similar unit may be connected to transmission line 6 or the cross-referenced dual loop adapter may be provided. The transformer is coupled to a suitable voltage supply through a transistor logic and drive circuitry to provide either low or high level signals corresponding to a logic "0" and logic "1" by actuation of suitable logic circuits or gates 53 which may, of course, be driven from any suitable timing circuit.

The two message frames are transmitted in synchronism to the next downstream loop remote station 2, where it is interconnected into the system through the connecting and processing circuitry, as discussed above. The illustrated embodiment including a bipolar data signal receiver such as shown in U.S. Pat. No. 3,798,608, one for each of the lines 5 and 6. A coupling transformer 54 is connected to a pair of polarity detectors 55 and produces appropriate binary logic signals. The output of the unit is shown connected to the loop selection circuit 28, which, as previously described, may be a simple multiplexing or decoding circuit to transmit one of the two simultaneously received message frames to the logic board 32a. Each of the message frames consists of four bytes including an initial loop address byte, a point module byte, a command byte and finally a data byte as more fully disclosed in U.S. Pat. No. 3,845,472 to Buchanan, et al. As described therein, each of the message frame bits is checked by the frame handling logic circuit. The first byte is clocked to a serial bit comparator 56 which may be a simple three input AND logic unit in which the status of the message frame status bits and the loop address bits are checked for selective use at the remote station. If the frame is assigned to a loop remote station, the comparator checks the loop address point by point and if it matches with a multiplex LRA (loop remote address) switch 57, a latch is set to generate a point enable signal. A byte and bit counter unit 59 is provided to drive the several components in synchronism with the message frame. As more fully developed in U.S. Pat. No. 3,798,608, the message frame bits from the receiver preferably, directly actuate a logic timing circuit 60 to generate appropriate clock and reset pulses for initiating and terminating the frame handling process. Thus, in FIG. 4, circuit 60 is connected to start and reset the counter 59 in synchronism with the message frames.

At point enable signal is connected through the point module bus to enable all point modules and to activate a serial to parallel register unit for transmitting the second through the fourth bytes of the message frame to the proper point module. The serial to parallel register 61 may be any known device.

The frame handling logic includes a means for the transmitting of each bit as it is received, with is illustrated as a AND/OR logic circuit, generally shown at 62. For example, if the message frame is to be transmitted unmodified, an AND gate 63 receives the bit signal with an appropriate status signal generated by the comparator 56 and the output is connected as one input of a multiple input OR gate 64. Similarly, other AND gates having appropriate inputs from various points of the circuit provide other inputs to the OR gate 64 for controlling of the transmission of the data bits from the logic circuitry 62 as modified and unmodified bits. A delay unit such as a flip-flop 65 may be connected into the circuit to delay transmission by one bit. The output is coupled, for example, through the NULL logic circuit 40. As previously disclosed, unit 40 may be an AND logic control circuit 66, one input of which is connected to the data signal and the opposite input of which is connected to a point acknowledge signal generated from the point module 35. Thus, if the point module is properly acknowledged, data is allowed to flow through to the transmitter 38 which may, of course, be constructed in the same manner as transmitter 50. If the point acknowledge signal is not received the data output from flip-flop 65 for the portion of the message comprising the command signals are changed to logic "0" before transmitting thereof to identify the NULL condition. Thus, a PM latch 66a is shown having an input connecting to the frame bit counter 59 and to the point acknowledge signal line. The latch 66a is connected on the second input to the gate 66. The counter 59 actuates the latch 66a to hold a logic "1" on the one input to gate 66 except during the command bits. During the command bits, the latch is set to respond to the PM Ack signal and provides a logic "1" only if the PM ack signal is received. If not received, a logic "0" is placed on the gate 66 and all command bits are transmitted by gate 66 as logic "0"s.

Point module 35 is shown as similar to that disclosed in U.S. Pat. No. 3,832,688. If the point module 35 is enabled as a result of the activation of the latch 58, the serial to parallel register 61 assembles the subsequent bytes as received and transmits them in parallel over the bus. The loop address is impressed on an address decoder 67, such as a conventional parallel to parallel comparator shown in U.S. Pat. No. 3,796,995 in which address switches constitute one input and the module address bits are strobed in as the other output. When properly addressed, a point module acknowledge signal is transmitted by gate 68 to the circuit 40 and a command decoder 69 is enabled. The latter may also be a decoding latch circuit, which responds to the command bits as also shown, for example, in U.S. Pat. No. 3,795,995, to generate a command output.

In the embodiment, the command would enable a status contact monitor circuit 70 for actuating an interrupt request logic unit 71, the output of which is connected to a priority logic at 72 for processing, as more fully disclosed in U.S. Pat. No. 3,832,688. The point module 35 has inputs connected to monitor the output state of the binary output drivers 34. As previously noted, they may be simple relax drivers which, in FIG. 4, are shown including an inverter 73 connected to drive status sensing relays 74, the output of which controls contact 74a for supplying power to a status sensing network 75. The output of network 75 is connected to the monitor circuit 70 and to the data bus transmitting circuit 76 for transmitting of the contact status, as more fully described in U.S. Pat. No. 3,832,688. The output is connected via the bus to a parallel to serial logic unit 77 for converting of the parallel data serial which is transmitted through an appropriate AND unit to OR gate 64 for transmission in serial fashion.

The bypass control includes means for monitoring of appropriate voltages. These may be the twelve volt and five volt supplies and the control 23 may be as disclosed in U.S. Pat. No. 3,852,727, which was filed on Dec. 15, 1972 and which issued on Dec. 3, 1974. The circuit includes a Schmitt trigger circuit 78, the output of which is connected to a "NOR" logic gate 79. The one input is connected to the twelve volt supply through a suitable dividing network. The power supply for the Schmitt trigger 78 is connected directly to the five volt monitor supply. Failure of either supply causes a corresponding failure of the trigger 78 and changing the logic signal to the gate 79 and removing power from a relay 80 which controls the several contacts 15 and 24 in the main loop connection. Indicator 25a may be a simple lamp connected in parallel with the relay 80. The bypass switch 25 may be a simple switch interconnecting the power supply directly to the relay 80.

Further, as previously noted, the transmitters 38–39 are preferably actuated to transmit the loop address in the event of failure of both incoming loop lines 5 and 6. This may, of course, be accomplished by providing a simple logic input signal at line 37a from the loss input logic unit 37 to a suitable timer 81, the output of which is connected directly to actuate the transmitters 38 and 39 and simultaneously generate the two message frames on the downstream signal portion of the loop lines 5 and 6.

FIG. 4 clearly illustrates the use of conventional circuitry and components such as shown in the cross-referenced application and patents of the original application and to otherwise disclose conventional logic circuitry for processing of the message frames. The present invention is not, of course, limited to the illustrated circuit which may be readily replaced, by those skilled in the art, by any other suitable circuit logic circuitry for sequentially processing the logic bits of each message frame.

The present invention thus provides a highly improved and reliable means of developing an asynchronous serial digital communication system with a minimum expense and complexity.

Various modes of carrying out the invention are comtemplated as being within the scope of the following claims, particularly pointing out and distinctly claiming the subject matter which is regarded as the invention.

We claim:

1. In a communication system having message frames circulated through a plurality of remote stations each having a message frame processing means comprising a plurality of parallel transmission trunk means connected between the several stations and each of said parallel transmission trunk means adapted to simultaneously transmit corresponding message frames from one remote station to the next remote station, each of said remote stations having a trunk selection means operably connecting one of said trunk means to the message processing means at the same remote station and including means to selectively transmit the message frame from one of said trunk means to the frame processing means for processing one of the simultaneously received message frames, and means for retransmitting of the processed message frame on the plurality of the trunk means to the next succeeding remote station.

2. In the communication system of claim 1 wherein said trunk selection means includes priority logic means selecting a given trunk means, and means responsive to failure of the transmission of the message frame over the selected trunk means to automatically transmit the message on an adjacent trunk means to the message processing means.

3. In the communication system of claim 1 including monitoring means to continuously monitor receipt of a message frame over the individual trunk means and to transmit an identifying message frame in response to failure to receive a message frame over all the incoming trunk means.

4. The communication system of claim 1 wherein said communication system includes "available" frames circulated through the system for receiving data from a remote station and being retransmitted as a filled frame, and trunk status sensing means coupled to said incoming trunk means and responsive to the failure of a trunk means to develop a message frame to automatically receive and fill an "available" message frame with identifying data and retransmit said filled "available" frame.

5. The communication system of claim 1 wherein each remote station includes a frame generating means, fault detection means to separately monitor each of the incoming trunk means to the remote station and means responsive to failure of all incoming trunk means to actuate said frame generating means.

6. The system of claim 5 having means to fill a received message frame to identify a fault condition in any one of the trunk means including a trunk means previously transmitting message frames to the processing unit and the redundant trunk means.

7. In the communication system of claim 1 having a digital message frame circulated through said plurality of remote stations in series, a pair of message receivers, detection units connected to the output of the receivers and establishing binary logic signals related to the receiving of the message bits, said trunk selection means including a binary logic means having an output connected to said message processing means and a binary input decoder connected to said detection units to selectively connect one of said receivers to said output.

8. In the communication system of claim 7 wherein the transmission means includes a plurality of transmitters having inputs connected in common to the message processing means and outputs connected one each to one of said trunk means.

9. A data communication loop system wherein plurality of remote stations are coupled to a central loop controller station through a serial transmission path means, each of said remote stations being adapted to receive a multiple bit digital message frame and having message frame processing means operable to process and retransmit said frame to a succeeding station, each of said remote stations further including a plurality of load devices divided into functional groups and with each group being defined as a point module, comprising a plurality of individual and separate transmission trunk means connected to each remote station and from each remote station to establish parallel transmission from and to each station, each of said remote stations including selection means to simultaneously receive message frames on such plurality of trunk means and to selectively transmit the message frame from one of said trunk means to the frame processing means, and having detection means responsive to failure to receive a message frame over a trunk means to transmit the message frame from a different trunk means to said frame processing means, each of said remote stations further including transmission means connected to the frame processing means to retransmit the processed message frame over all of the plurality of trunk means to the next adjacent downstream remote station.

10. The data communication loop system of claim 9 wherein said data communication system including available frames circulated through the loop system for receiving data from a remote station and being retransmitted as a filled frame to the controller, and having trunk status sensing means coupled to said incoming trunk means and operable to said failure of a trunk means to develop a message frame for automatically transmitting identifying information to said loop controller.

11. The data communication loop system of claim 9 including means to separately identify each of the incoming trunk means at a remote station and to individually identify a fault condition in any one of the trunk means including a trunk previously transmitting message frames to the processing unit and to the redundant trunk means.

12. The data communication loop system of claim 9 wherein said controller generates "available" message frames to be filled by any one of said remote stations, each of said remote stations include a trunk terminating and connection means for interconnecting of the plurality of trunk means to a single trunk message frame processing means, said connection means including individual input coaxial cables and individual output coaxial cables connected respectively to the said trunk means, a pair of receivers connected respectively to said input cables, a first loop failure detection unit connected to the output of the first receiver and establishing a logic output signal related to the presence and failure of a message signal, a second failure detection unit connected and to the output of the second receiver and establish a logic output signal in accordance with the presence and failure of a message frame at said second receiver, a multiplexing means having an input binary decoder connected to said failure detection units, said multiplexing means having a pair of data input means connected respectively to said first and second receivers and having a single data output line connected to the message frame processing means, said remote station including a contact status sensing module including a plurality of status sensing inputs connected respectively one each to the failure detection units, said contact status sensing unit module being operable to establish an interrupt condition for receiving of an "available" message frame and filling of said frame with the status of the corresponding trunk means and then retransmitting of said "available" frame as a filled message frame to the loop system, a dual input logic gate means having a pair of inputs connected respectively to the failure detection units and responsive to failure of both trunk means to generate an output logic signal, each of said remote stations including a fault frame generator operable to and in response to a logic input signal to continuously generate in timespaced sequence similar filled message frames uniquely identifying the remote station and thereby locating the dual failure between a pair of adjacent stations, the output of said logic gate means being connected to the frame processing means to actuate said fault location identifying frame generator within the remote station to thereby continuously generate dual fault location identifying frames for transmission downstream of the loop to the central station.

13. The data communication loop system of claim 9 wherein a pair of said trunk means are provided to each of said remote stations, each station includes a dual trunk termination and connection means for interconnecting of the dual trunk means to a single trunk message frame processing means, a by-pass control switch, said dual connection means including a pair of input coaxial cables and a pair of output coaxial cables connected respectively to the said pair of trunk means to the opposite sides of said by-pass control switch, a pair of receivers connected respectively to said input cables, a loop failure detection unit connected to the output of the first receiver and establishing a logic output signal related to the presence and failure of a message signal, a second failure detection unit connected to the second receiver and establishing a logic output signal in accordance with the presence and failure of a message frame at said receiver, a multiplexing means having an input binary decoder connected to said failure detection units, and said multiplexing means having a pair of data input means connected respectively to said first and second receivers and having a single data output line connected to the message frame processing means in accordance with the decoder.

14. The loop system of claim 13 wherein each of said remote stations includes a contact status sensing module including a plurality of status sensing inputs connected respectively one each to the failure detection units, said contact status sensing unit module being operable to establish an interrupt condition for receiving of an "available" message frame and filling of said frame with the address of the remote station and then retransmitting of said "available" frame as a filled message frame to the loop system, said controller sending a message frame to interrogate the status of the contact status sensing module and thereby obtaining an indication of which loop segment failed.

15. The system of claim 13 wherein each station includes an input logic gate means having a pair of inputs connected respectively to the failure detection units and responsive to failure of both trunk means to generate an output logic signal, each of said remote stations including a fault frame generator operable to and in response to a logic input signal to continuously generate time-spaced sequence similar filled message frames uniquely identifying the remote station and thereby locating the dual failure between a pair of adjacent stations, the output of said logic gate means being connected to the frame processing unit to actuate said fault location identifying frame generator within the remote station to continuously generate dual fault location identifying frames for transmission downstream of the loop to the central controller.

16. A connection unit for adapting a remote station for connection to other remote stations and to a central loop controller in a plurality of transmission path means, each of said remote stations being adapted to receive a multiple bit digital message frame and operable to process and retransmit said frame to a succeeding station, comprising a plurality of individual transmission trunk termination means to simultaneously receive message frames and a plurality of individual transmission trunk origination means, trunk selection means connected to said trunk termination means and responsive to the simultaneously received and identical incoming message frames to transmit one of said message frames from one of said trunk means to the frame processing means, transmission means connected to the trunk origination means to retransmit the processed message frame over all of the plurality of trunk origination means, each of said stations including means responsive to failure to receive a message frame over a trunk termination means to activate the processing means for selection and transmission of an identifying message frame from a different trunk termination means to said transmission means.

* * * * *